US009151920B2

(12) United States Patent
Lu et al.

(10) Patent No.: US 9,151,920 B2
(45) Date of Patent: Oct. 6, 2015

(54) HIGH DENSITY OPTICS AND ELECTRONICS ENCLOSURE HOUSING SYSTEM WITH CABLE MANAGEMENT

(71) Applicant: Go!Foton Holdings, Inc., Somerset, NJ (US)

(72) Inventors: Haiguang Lu, Los Altos, CA (US); Kenichiro Takeuchi, North Brunswick, NJ (US); Mengjue Wang, Somerset, NJ (US); Akimitsu Sato, Somerset, NJ (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 14/201,010

(22) Filed: Mar. 7, 2014

(65) Prior Publication Data
US 2015/0253529 A1 Sep. 10, 2015

(51) Int. Cl.
*G02B 6/00* (2006.01)
*G02B 6/44* (2006.01)
*H05K 7/18* (2006.01)

(52) U.S. Cl.
CPC .............. *G02B 6/4453* (2013.01); *H05K 7/186* (2013.01)

(58) Field of Classification Search
CPC ............................ G02B 6/3897; G02B 7/4471
USPC .......................................................... 385/135
See application file for complete search history.

(56) References Cited

U.S. PATENT DOCUMENTS

| 2006/0093301 | A1* | 5/2006 | Zimmel et al. ................ 385/135 |
| 2011/0317974 | A1* | 12/2011 | Krampotich et al. ......... 385/135 |
| 2014/0086545 | A1* | 3/2014 | Solheid et al. ................ 385/135 |
| 2014/0348481 | A1* | 11/2014 | Giraud et al. ................. 385/135 |
| 2014/0376870 | A1* | 12/2014 | Takeuchi et al. .............. 385/135 |

* cited by examiner

*Primary Examiner* — Sung Pak
(74) *Attorney, Agent, or Firm* — Lerner, David, Littenberg, Krumholz & Mentlik, LLP

(57) ABSTRACT

A cable support device having a first portion at a back side thereof and a second portion at a front side opposite the back side of the cable support device, the first portion adapted to couple to a front side of a housing, and the second portion adapted to support a length of at least one cable extending along a direction of the front side of the cable support device, wherein the cable support device is transitionable between a first state and a second state, wherein, in the first state, the second portion extends at a first angle with respect to the front side of the housing, and in the second state, the second portion extends at a second angle with respect to the front side of the housing, the second angle being different from the first angle.

19 Claims, 6 Drawing Sheets

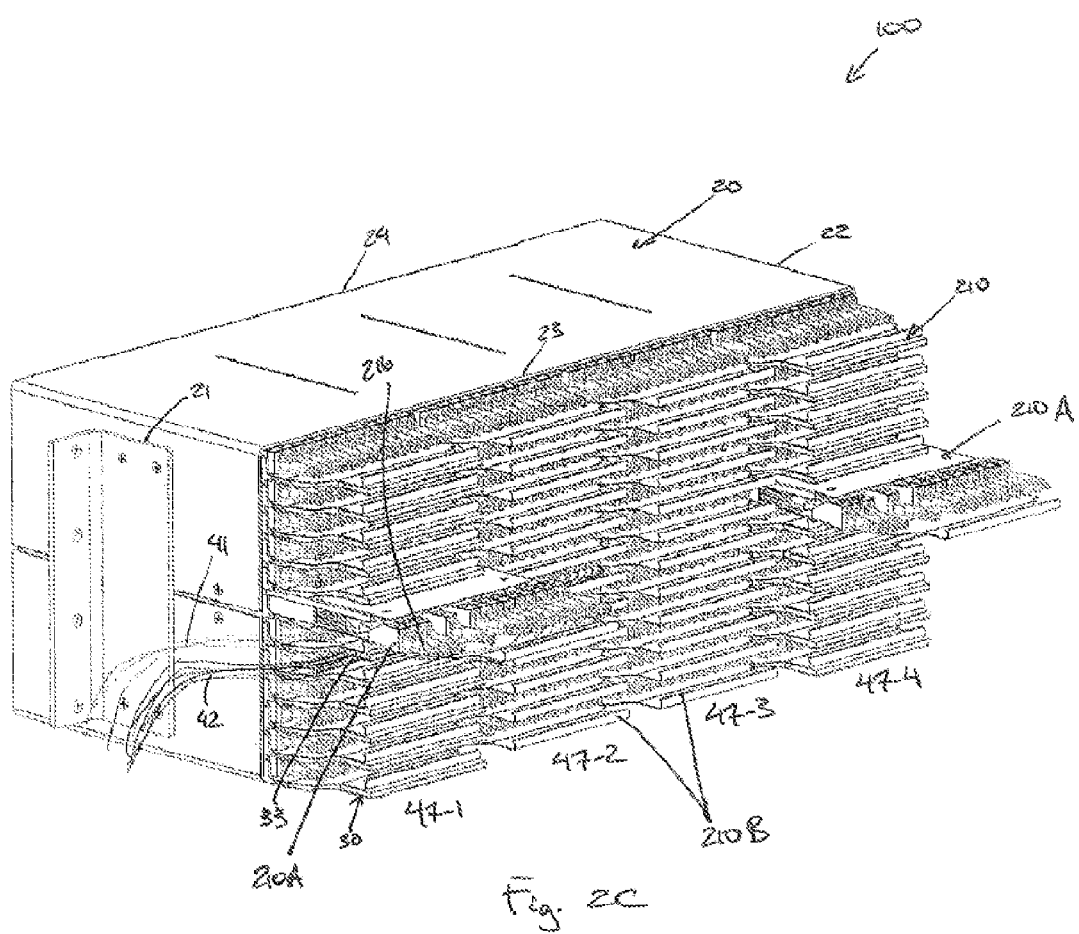

HIGH DENSITY OPTICS AND ELECTRONICS ENCLOSURE HOUSING SYSTEM WITH CABLE MANAGEMENT

FIELD

The present disclosure generally relates to a device and a system for supporting and managing cables for networking with communication connectors, adapters, and/or ports. More particularly, the present disclosure relates to a cable management device and system, which facilitates the organized routing of said cables to communication connectors, adapters, and/or ports supported by the system.

BACKGROUND

In communication networking applications, a cassette, which is a compact, unitary apparatus for routing one or more cables to one or more optical or electronic devices enclosed within the cassette, may be provided. The cassette serves to facilitate coupling of the device with one or more cables, as well as protect the device from potential damage such as mechanical shock or contaminants. As a plurality of devices is often required in a single networking application, a plurality of cassettes may be provided to enclose the devices, and a housing may typically be provided to store the cassettes in an organized manner, such as in rows and columns. However, because each individual cassette within the housing typically receives a plurality of cables, the cables extending from an organized configuration of cassettes may nevertheless be disorderly, even to the point of rendering it difficult to access cassettes stored within the housing or individual cables.

As such, there exists a need for an improved device and system for managing the cables extending from the plurality of cassettes typically required in a networking installation.

BRIEF SUMMARY

In one embodiment of the present disclosure, a cable routing apparatus for routing at least one cable in a cassette housing system, the system including a housing having front, back, left, and right sides, and for receiving at least one cassette transitionable from a stored state to a retracted state and vice versa, the cassette including an enclosure having a bottom surface extending from a front side to a back side of the cassette and one or more ports at the front side of the cassette, the cable routing apparatus may include: a cable support device having a first portion at a back side thereof and a second portion at a front side opposite the back side of the cable support device, the first portion adapted to couple to the front side of the housing, and the second portion adapted to support a length of the at least one cable extending along a direction of the front side of the cable support device, wherein the cable support device is transitionable between a first state and a second state, wherein, when the cassette is received in the housing of the system and in an installed state of the cable support guide the first portion of the cable support device is coupled to the front side of the housing such that the bottom surface of the cassette is overlying the cable support device, when the cassette is in the stored state, the cable support device is in the first state, in which the second portion extends at a first angle with respect to the front side of the housing, when the cassette is in the retracted state, the cable support device is in the second state, in which the second portion extends at a second angle with respect to the front side of the housing, the second angle being different from the first angle, the second angle based on a position of the front side of the cassette away from the front side of the housing.

In another embodiment of the present disclosure, a communication cable system may include a housing having front, back, left, right, top and bottom sides, at least one cassette slidably received within the housing and transitionable between a stored state and a retracted state, each cassette including an enclosure having a bottom surface extending from a front side to a back side of the cassette, and one or more ports at the front side of the cassette configured to couple to a cable; at least one cable support device, each cable support device having a first portion at a back side thereof and a second portion at a front side opposite the back side of the cable support device, wherein the second portion is adapted to support a length of a cable extending along a direction of the front side of the cable support device, wherein the cable support device is transitionable between a first state and a second state, wherein the cable support device is coupled at the first portion to the front side of the housing such that a bottom surface of a first cassette of the at least one cassette is immediately overlying the cable support device, and wherein, in the first state, the second portion extends at a first angle with respect to the front side of the housing; wherein, in the second state, the second portion extends at a second angle with respect to the front side of the housing, the second angle being different from the first angle and based on a position of the front side of the cassette away from the front side of the housing; wherein the cable support device is in the first state when the cassette is in the stored state; and wherein the cable support device is in the second state when the cassette is in the retracted state.

These and other features of the present disclosure will be more fully described with reference to the accompanying figures.

BRIEF DESCRIPTION OF THE DRAWINGS

By way of description only, embodiments of the present disclosure will be described herein with reference to the accompanying drawings, in which:

FIG. 2C is a perspective view of the cassette housing system of FIG. 2B with two of the cassettes in a retracted state;

DETAILED DESCRIPTION

Figure 1A:
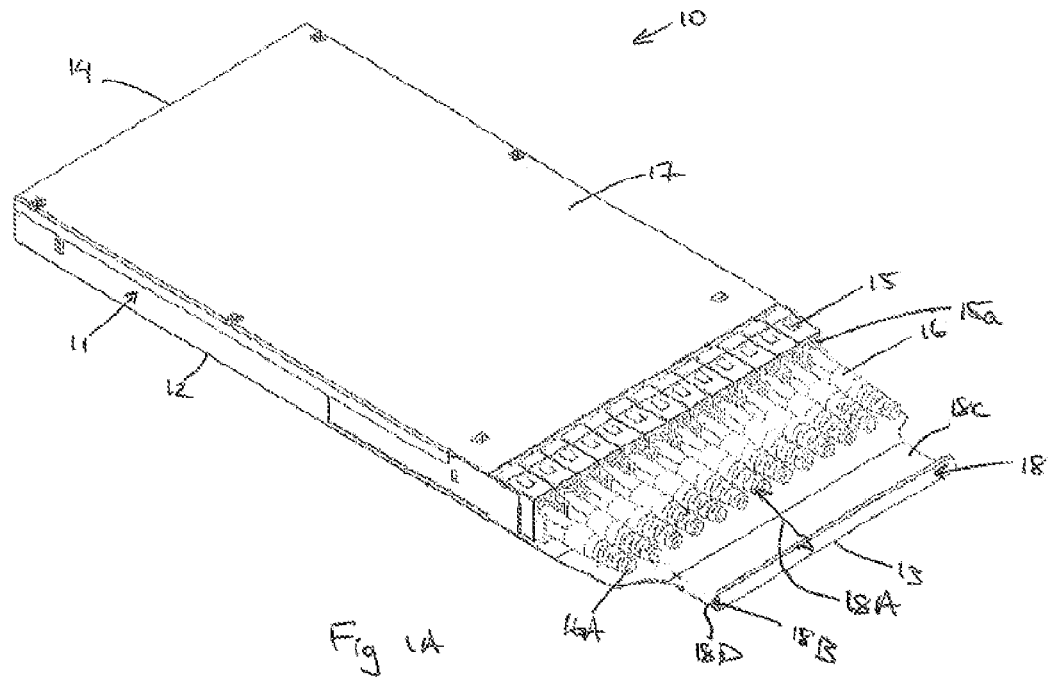
FIG. 1A is a perspective view of a cassette including an enclosure and a plurality of ports.

Particular embodiments of the present disclosure will be described with reference to the accompanying drawings. In the figures and in the description that follow, in which like reference numerals identify similar or identical elements, the term "front" will refer to the side of the device or apparatus that is closest to the operator or user during use, while the term "back" will refer to the side of the device or apparatus that is furthest from the operator or user during use.

An exemplary cassette 10 will now be described with reference to FIG. 1A. The cassette 10 may include an enclosure 11 having a bottom portion 12 extending from a front side 13 to a back side 14, a device (not shown) stored within the enclosure 11, and one or more ports 15, which may each include an adapter 15a operably coupled thereto. The bottom portion 12 may be configured for receiving and attaching thereto one or more electrical, optical or electro-optical devices, such that the devices may be stored within the enclosure 11. The adapter 15a may support one or more connectors 16 facing the front side 13, to which cables may be operatively coupled. The ports 15, at a portion facing the back side 14, may be configured for connection with a suitable connection means (not shown) which communicatively connects a cable attached to the connector 16, through the port 15 and to the device stored within the enclosure 11. A lid 17 may be provided to protect and enclose the devices stored within the enclosure 11.

The enclosure 11 may further include a lip 18 having top and bottom surfaces 18C, 18D extending from the bottom portion 12 at the front side 13 to facilitate the pushing or pulling of the cassette 10 into or out of a housing 20, as described below in the text accompanying the description of FIGS. 2A, 2B, and 2C. The lip 18 may be configured to extend a predetermined length away from the bottom portion 12, such that a space 18A extending in a direction of the front side 13 is defined between ends 16A of the connectors 16 facing away from the back side 14 and an end 18B of the lip 18 facing the ends 16A. The space 18A is configured such that, when cables are attached to the connectors 16 at the ends 16A, lengths of the cables that extend from the connectors 16 may extend longitudinally along the length of the space 18A overlying the top surface 18C so as to be contained in an organized manner within the space 18A by the lip 18.

Figure 1B:
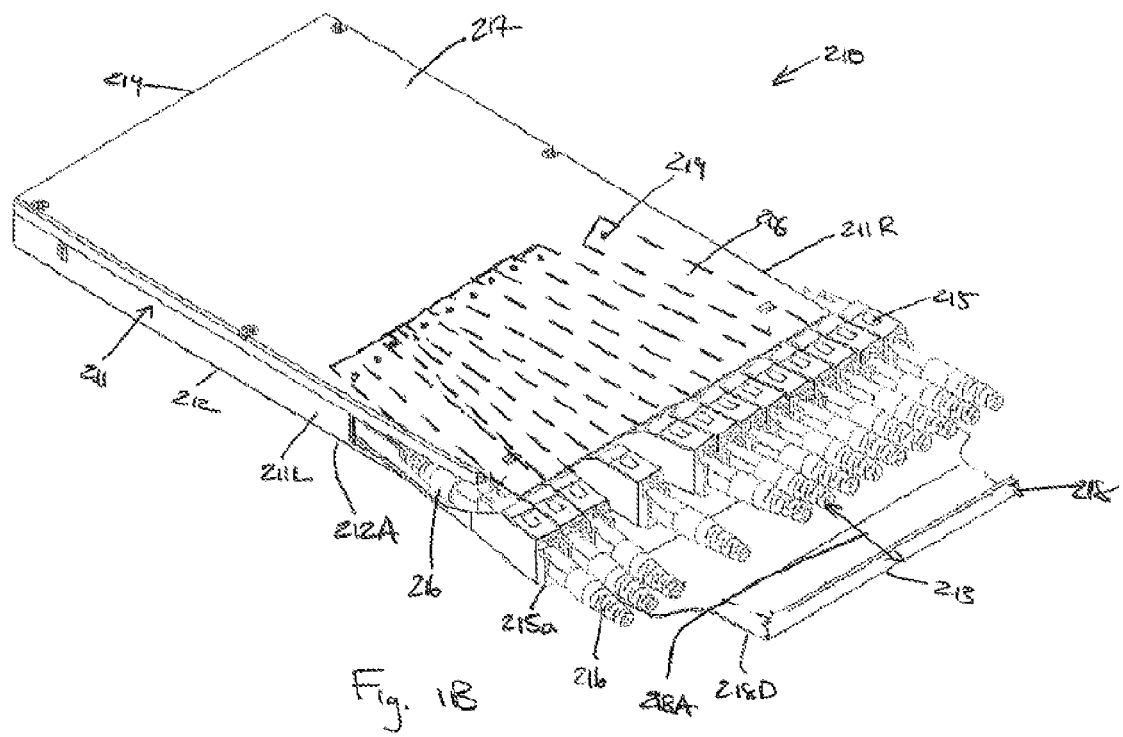
FIG. 1B is a perspective view of another embodiment of a cassette including an enclosure and a plurality of ports.

Another embodiment of a cassette 210 is shown in FIG. 1B. The cassette 210 may include an enclosure 211 having a bottom portion 212 extending from a front side 213 to a back side 214, a lid 217 overlying the bottom portion 212, one or more ports 215 having adapters 215a thereon attached to the bottom portion 212 at the front side 213, and a lip 218, similarly as in the cassette 10. In this embodiment, the adapters 215a may operably support connectors 216 facing both the front side 213 and back side 214 of the enclosure 211. Furthermore, the ports 215 may be coupled to respective arms 206 (shown by dashed lines) that are each operatively coupled in a pivotable relationship with the bottom portion 212, where a pin 219 pivotably connects an end of each arm 206 facing the back side 214 with the bottom portion 212. (See U.S. Ser. No. 13/749,924, incorporated by reference herein). In such a configuration, the ports 215 with the respective arms 206 connected thereto may be rotated about the pins 219, such that the ports 215 individually may be repositioned with respect to one another and a desired gap distance between the ports 215 is achieved. The pivotal movement of a port 215 away from an adjacent port 215 in a direction of a left or right side 211L, 211R of the cassette 210, thus, may provide a user easier access to a specific port 215 of the cassette 210.

Figure 1C:
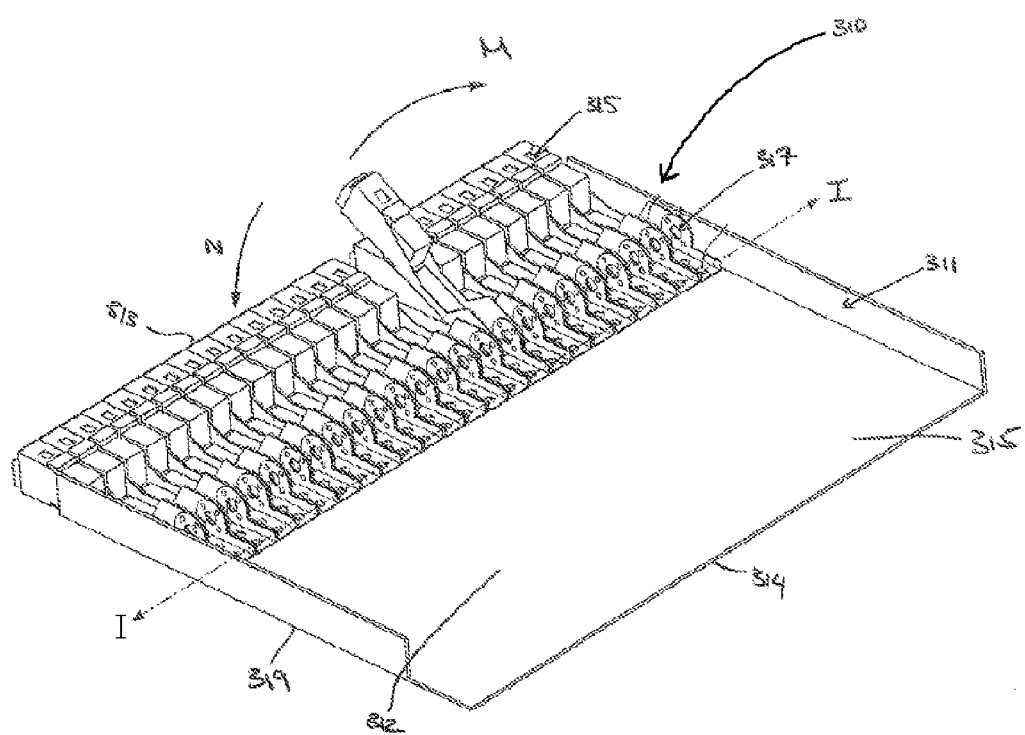
FIG. 1C is a perspective view of yet another embodiment of a cassette including an enclosure and a plurality of ports.

Yet another embodiment of a cassette 310 is shown in FIG. 1C. The cassette 310 includes an enclosure 311 having a bottom portion 312 extending from a front side 313 to a back side 314, and one or more ports 315. The ports 315 may be fixedly coupled to the bottom portion 312 at an axis I respectively by attachment sections 317, which are pivotably secured to each other, such as described in U.S. Ser. No. 13/749,924, incorporated by reference herein. The ports 315 may be radially translated about an axis parallel to the axis I (see FIG. 1C), such as in a direction M towards a top surface 315 of the bottom portion 312 or in a direction N towards a bottom surface 319 of the bottom portion 312, such that individual ports 315 may be spaced apart from adjacently positioned ports 315. As in cassette 210, the ports 315 may be pivotally moved to provide a user easier access to a specific port 315 of the cassette 310. In contrast with cassettes 10 and 210, the cassette 310 is shown without a lid or a lip, although it is envisioned that a lid may be provided to protect a device (not shown) within the enclosure 311, and a lip may be provided to facilitate the pushing or pulling of the cassette 310 into or out of a housing 20 (see FIGS. 2A and 2B) and also for routing lengths of cables in the direction of the front side 313 of the cassette 310.

An exemplary cassette housing system 100 will now be described with reference to FIGS. 2A-2C. Referring to FIG. 2A, the system 100 includes a housing 20 having a left side portion 21, a right side portion 22, a bottom side portion 37, a top side portion 39 and a back side portion 24, and which is open at a front side 23. The housing 20 may further include a flange 25 attached to an exterior surface of the left side portion 21 to facilitate mounting of the system 100 to a rack or other structure, and dividers 29 extending from the top side portion 39 to the bottom side portion 37, and between the front side 23 and the back side portion 24. The space between adjacent dividers 29, such as the dividers 29A, 29B, or the dividers 29B, 29C, or the space between a left or right side portion 21, 22 and an adjacent divider 29A, 29C, such as the divider 29A and the left side portion 21 or the divider 29C and the right side portion 22, may define a column region 47 for storing cassettes 210 in a stack. Each column region 47 may include a plurality of shelves 26 extending from the adjacent dividers 29, or the divider 29A, 29C and left or right side portion 21, 22 of the housing 20, that form the column region 47.

Figure 2A:
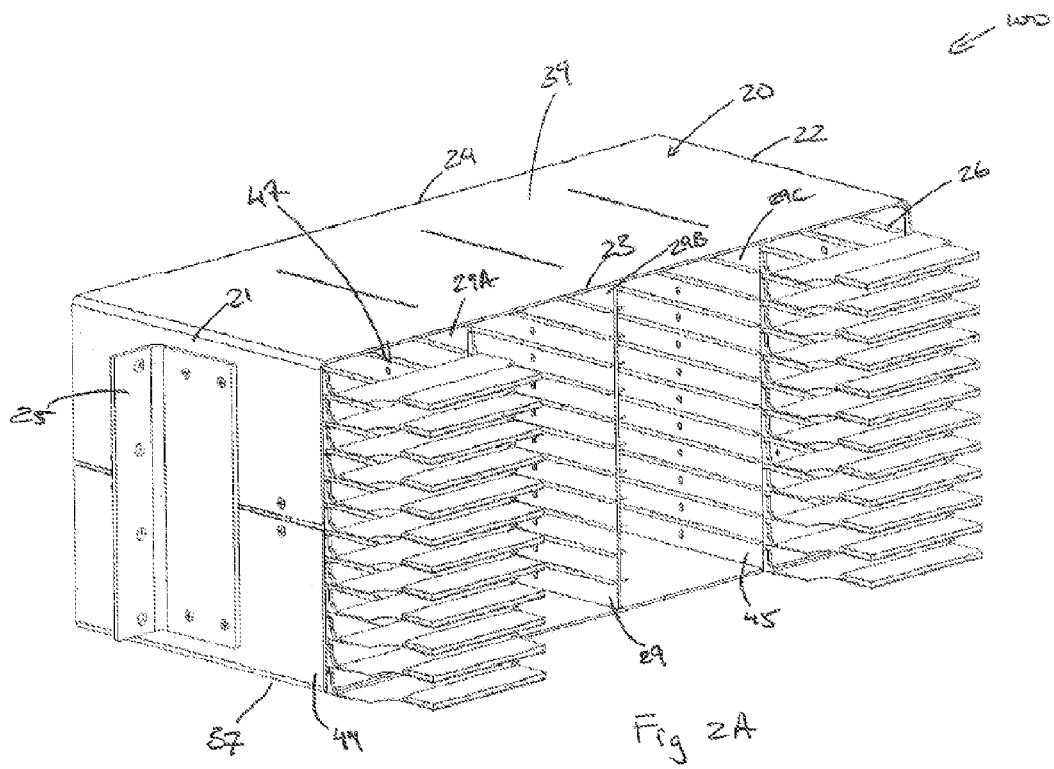
FIG. 2A is a perspective view of a cassette housing system without cassettes stored within.
Figure 2B:
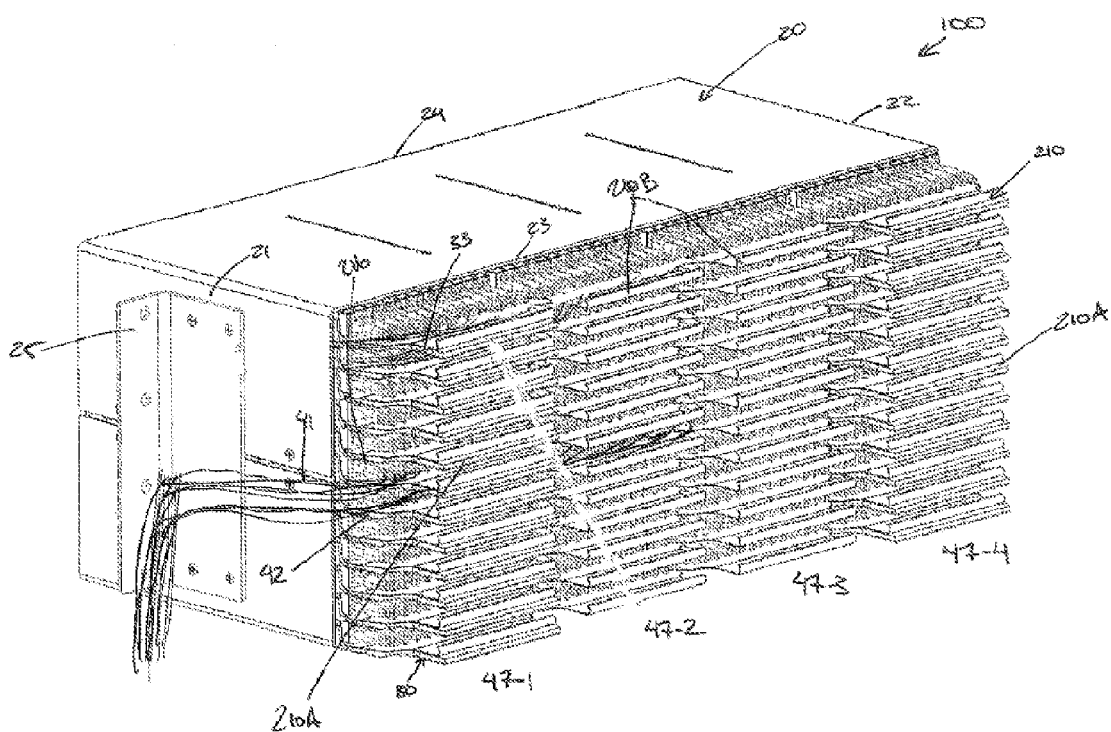
FIG. 2B is a perspective view of the cassette housing system of FIG. 2A, storing multiple cassettes with cables extending therefrom, in a stored state.

Referring to FIGS. 2B and 2C, the column regions may be configured such that cassettes 210 may be slidably supported by respective pairs of the shelves 26 thereof, and the cassettes 210 may transition, by sliding over the shelves 26, between a stored state (see FIG. 2B) and a retracted state, such as shown by the cassette 210A in FIG. 2C. The shelves 26 may be configured within the housing 20 such that the cassettes 210 supported thereon may be arranged in vertical stacked alignment in column regions 47-1, 47-2, 47-3, and 47-4, where cassette 210A represents cassettes stored in column regions 47-1 and 47-4, which are formed by a divider 29 and a left or right side portion 21, 22 of the housing 20, and cassette 210B represents cassettes stored in column regions 47-2 and 47-3, which are formed by adjacent dividers 29. Although cassettes 210 are shown stored within the housing 20, it is understood that any other embodiment of a cassette, including embodiments not explicitly described in this disclosure, may be compatible with the system 100.

Figure 3A:
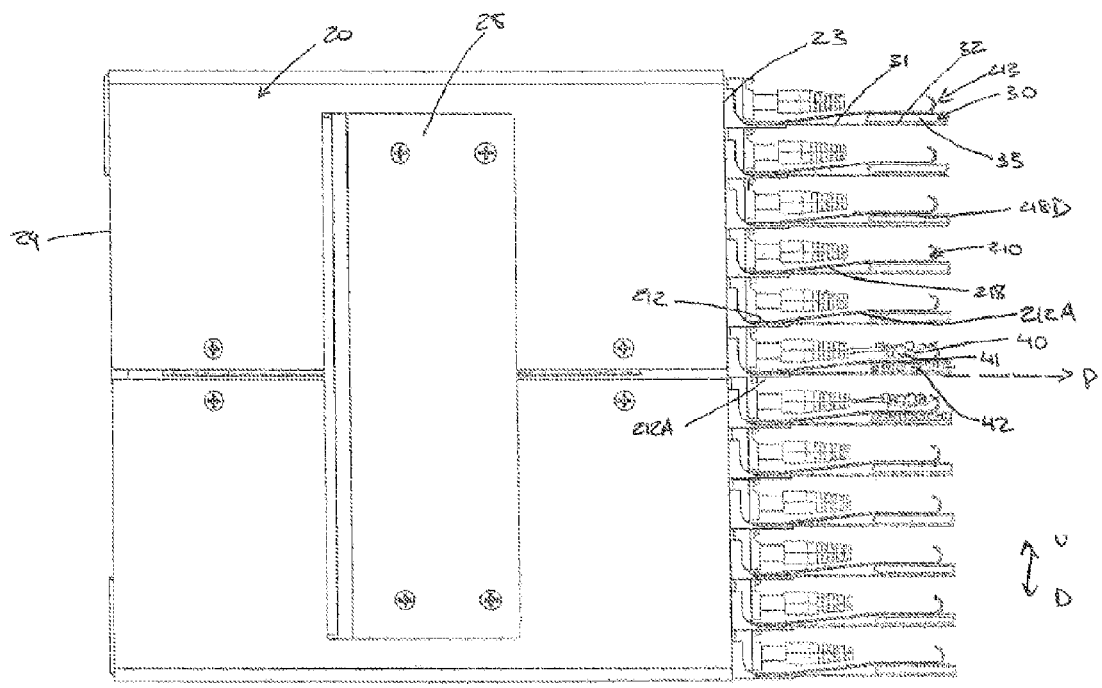
FIG. 3A is a side view of the cassette housing system of FIG. 2A, storing multiple cassettes with cables extending therefrom, in a stored state.
Figure 3B:
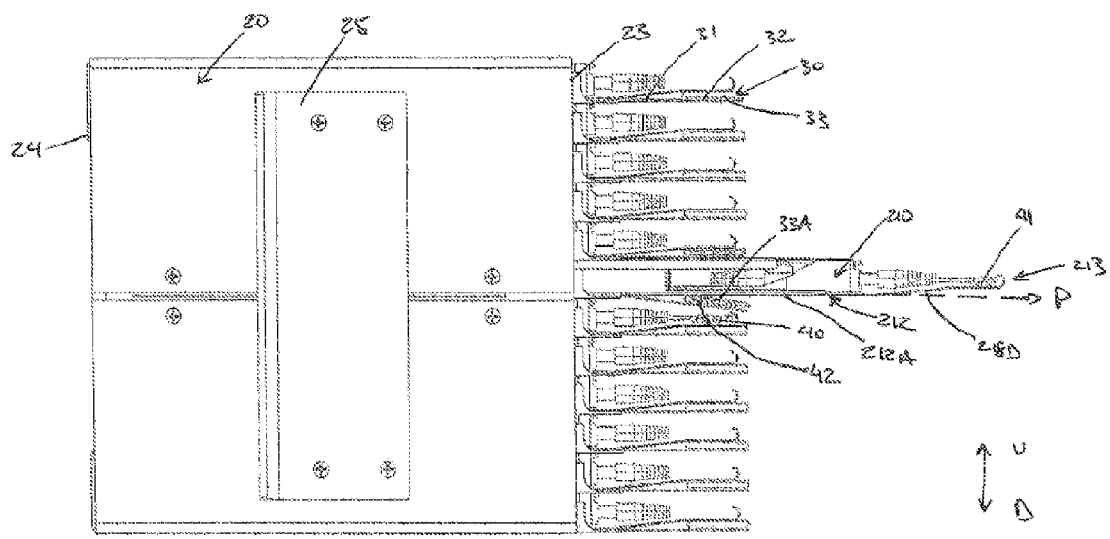
FIG. 3B is a side view of the cassette housing system of FIG. 3A with one of the cassettes in a retracted state.
Figure 4:
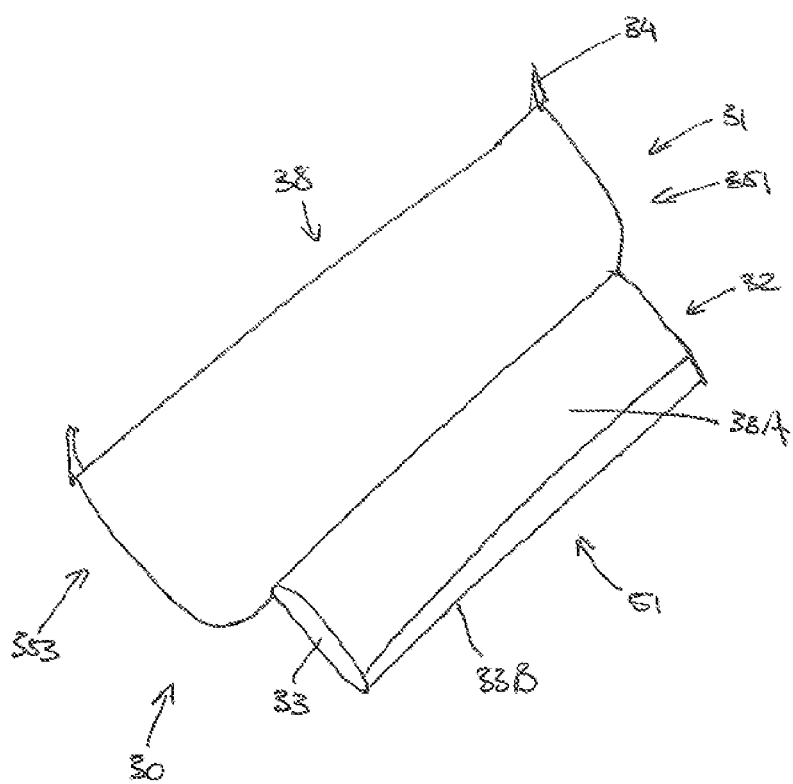
FIG. 4 is a perspective view of an exemplary cable support device.

Further referring to FIGS. 3A, 3B and 4, a cable support device 30 having a back side 38, a front side 51, a left side 353, and a right side 351 may be disposed along the front side 23 of the housing 20, adjacent a pair of shelves 26 that are for slidably supporting a cassette 210. The device 30 may include flanges 34 at the back side 38 configured to couple the device 30 to the housing at the front side 23. In one embodiment, the flanges 34 may be attached to a pair of the shelves 26 arranged to support a cassette 210. In another embodiment, the support device 30 may be attached to the housing 20 by fixing the flanges 34 to a front surface 45 of a divider 29 or a front surface 49 of the left side portion 21 or the right side portion 22 of the housing 20 (see FIG. 2A). The device 30 may be configured such that, when attached to the housing 20, the device 30 extends immediately beneath a bottom surface 212A of the bottom portion 212 or the bottom surface 218D of the lip 218 of a cassette 210 supported on a pair of shelves 26 (see FIG. 1B). The cable support device 30 may include a first portion 31 including the flanges 34 arranged to couple to the front surfaces 45 or 49 of the housing 20, and a second portion 32 extending from the first portion 31 in a direction away from the back side 38. The second portion 32 may define a portal 33 having top and bottom surfaces 33A, 33B, where the portal 33 is configured to receive cables 40 therein and provide that the cables 40 may extend longitudinally therethrough along the front side 51, from a right side 351 to a left side 353 of the device 30.

In accordance with the present disclosure, when the cable support device 30 is attached to the housing 20 at the front side 23 by the first portion 31, the device 30 is operable such that at least the second portion 32 is movable in generally upward or downward vertical directions U, D so as to extend at different angles relative to the front side 23 of the housing 20. In one embodiment, the first and second portions are made from a flexible resilient material (e.g., a plastic), such that the second portion 32 alone, or with at least a portion of the first portion 31, may deflect or bend slightly when a force is applied to the second portion 32 and the first portion 31 is fixedly attached at the back side 38 to the housing 20. The device 30 may be configured such that (i) when a force is applied to the portion 32 with the portion fixedly attached to another component, for example, the left or right side portions 21, 22 of the housing 20 or the dividers 29, the portion 32 may deflect or bend away from the portion 31 in a direction in which the force is applied, so the device 30 transitions to and remains in a deflected state so long as the force continues to be applied, and (ii) when little or no force is applied to the portion 32 with the portion 31 fixedly attached to another component, the device 30 is or remains in, or may return to a normal state from the deflected state, in which the portions 31 and 32 are co-planar or substantially co-planar. Stated another way, the device 30 is configured having structural and material characteristics such that at least the portion 32 of the device 30 may be bent or deflected relative to the portion 31 to obtain a deflected state when a force is applied to the portion 32 and the portion 31 is fixedly attached to another component, and where the device 30 is biased to remain in and return to the normal state when little or no force is applied to the portion 32. As described below, the amount of bending of the second portion 32, in other words, the angle of the second portion 32 relative to the front side 23 of the housing 20, is defined based on the position of the cassette 210 overlying the cable support device 30 away from the back side 24 of the housing 20.

Referring to FIGS. 3A and 3B, based on the positioning of a cassette 210 overlying the device 30 corresponding thereto, the device 30 may transition between a first, normal state (FIG. 3A) in which the first and second portions 31, 32 are substantially coplanar, and a second, deflected state (FIG. 3B) in which the first and second portions 31, 32 are not co-planar. The cassette 210 may be configured such that, when the cassette 210 is in a stored state (FIG. 3A), the lip 218 of the cassette 210 overlies the immediately underlying cable support device 30 without applying a force or sufficient force in the direction D on the portion 32 of the cable device 30 to cause the portion 32 to deflect in the direction D. In other words, when the cassette 210 is in the stored state, the corresponding device 30 is in the normal state. In one embodiment, the lip 218 may be configured to extend at an angle away from the bottom portion 212, such that in the stored state of the cassette 210, the portion 32 including the portal 33 of the immediately underlying cable support device 30 may be disposed in a space defined between a bottom surface 218D of the lip 218 and a nominal plane P co-planar with bottom surface 212A of the bottom portion 212 of the cassette 210. As the cassette 210 is slidably moved away from the back side 24 of the housing 20 from the stored state to a retracted state (FIG. 3B), the bottom surface 218D of the lip 218 and then the bottom surface 212A of the cassette 210 may contact the top surface 33A of the portal 33 to cause a force to continuously act on the top surface 33A in the direction D, such that the second portion 32 is caused to bend or deflect in the direction D through the nominal plane P away from the bottom surface 212A and the cable support device 30 to transition into and remain in the second deflected state. In the second state, the portion 32 extends at a different angle away from the front side of the housing than when the device 30 is in the normal state, and such different angle is determined based on the position of the cassette 210 away from the back side 24 of the housing 20. In addition, when the cassette 210 is slidably moved to transition from the retracted state (FIG. 3B) to the stored state (FIG. 3A), the cassette 210 is moved into the housing 20 such that the bottom surface 212A and then the bottom surface 218D contact the top surface 33. Based on such movement of the cassette 210, the angled configuration of the bottom surface 218D gradually permits movement of the portion 32 in the direction U through the plane P, such that the portion 32 becomes disposed between the plane P and the bottom surface 218D, i.e., the device 30 is in the first normal state, as a force in the direction D sufficient to cause bending of the portion 32 no longer acts on the portion 32.

Referring to FIGS. 2B and 2C, in an installed state of the system 100, cables 40 may be coupled to connectors 216 of the cassettes 210 in the column regions 47. In one embodiment, cables 41 may be coupled to and extend from cassettes 210A arranged in the column regions 47-1, 47-4, which are adjacent the left and right side portions 21, 22 of the housing 20, whereas cables 42 may be coupled to and extend from cassettes 210B arranged in the column regions 47-2, 47-3. Cassettes 210A and cassettes 210B may be substantially the same type of cassettes 210, but are distinguished from each other herein to specify their positioning in the column regions 47 of the housing 20. Similarly, cables 41 and cables 42 may be substantially the same type of cables 40, but are distinguished from each other herein to specify their positioning in the column regions 47 of the housing 20 when connected to their respective cassettes 210.

In an installed state, for example, referring to FIG. 2C, the cables 41 attached to a cassette 210A in the column region 47-1 and 47-4 may be routed, from the connectors 216 thereof, across the space 218A of the cassette 210A, and then away from the cassette 210A and along an adjacent left or right side 21, 22 to the flange 25, whereupon the cables 41 may extend up or down the flange 25, which may serve as a vertical guide for the cables 40. The cables 42 attached to a cassette 210B in column regions 47-2 and 47-3, which column regions 47 are not defined by the left or right side portions 21, 22 of the housing 20, may be routed across the space 218A of cassette 210B, and then through the portal 33 of a cable support device 30 disposed below the cassette 210A in the adjacent column region, such as in the column region 47-1 or 47-4, and then along a left or right side portion 21, 22 to the flange 25, whereupon cables 42 may also extend up or down the flange 25. It is to be understood that although the system 100 of FIGS. 2A and 2B includes four column regions 47, a system in accordance with the present disclosure may include any desired number of column regions 47 and be adapted to include cable support devices 30 associated with cassettes 210 of any of the column regions 47, such that cables 40 extending from a cassette 210 in any column region 47 may be routed to a left or right side portion 21, 22 of the housing 20 by one or more cable support devices 30 respectively of one or more column regions 47.

As shown in FIGS. 2B and 3A, when a cassette 210A of column region 47-1 is in the stored state, the cable support device 30 underlying the cassette 210A through which the cables 42 extending from an adjacent cassette 210B, such as of the column region 47-2 are routed, is in a first state. As shown in FIGS. 2C and 3B, when the cassette 210A of column 47-1 is transitioned to a retracted state, the cable support device 30 underlying the cassette 210A in the column region 47-1 transitions into the second state, such that movement of the cables 42 from the adjacent cassette 210B in the column region 47-2 away from the housing 20 with the cassette 210A of the region 47-1 may be avoided. Consequently, the cables 42 from the cassette 210B are maintained substantially in the same position in relation to the housing 20, and there is ease of access to the cables 41 attached at the connectors 216 of the cassette 210A when the cassette 210A is retracted from the housing 20. Advantageously, the portal 33 of the cable support devices 30 may provide that the cables 40 extending from any cassette 210 from any of the column regions 47, such as column regions 47 not defined by the left or right side portions 21, 22 of the housing 20, may be neatly routed across the front side 23 of the housing 20, without obstructing or interfering with the cables 40 extending from connectors 216 of a cassette 210 in an adjacent column region 47 of the housing 20, such as the cassettes 210A in the column regions 47-1, 47-4, when such cassettes 210A are transitioned between a retracted state and stored state.

In another embodiment, the first portion 31 may be pivotably connected to the housing or the second portion 32 by a suitable pivoting means, such as a hinge or like flexible connection (not shown), such that the first and second portions 31, 32 together may move or only the second portion 32 may move in the direction U or D similarly as described above, based on transitioning of the cassette 210 between the retracted state and stored state.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims.

The invention claimed is:

1. A cable routing apparatus for routing at least one cable in a cassette housing system, the system including a housing having front, back, left, and right sides, and for receiving at least one cassette transitionable from a stored state to a retracted state and vice versa, the cassette including an enclosure having a bottom surface extending from a front side to a back side of the cassette and one or more ports at the front side of the cassette, the cable routing apparatus comprising:
a cable support device having a first portion at a back side thereof and a second portion at a front side opposite the back side of the cable support device,
the first portion adapted to couple to the front side of the housing, and
the second portion adapted to support a length of the at least one cable extending along a direction of the front side of the cable support device,
wherein the cable support device is transitionable between a first state and a second state,
wherein, when the cassette is received in the housing of the system and in an installed state of the cable support guide the first portion of the cable support device is coupled to the front side of the housing such that the bottom surface of the cassette is overlying the cable support device:
when the cassette is in the stored state, the cable support device is in the first state, in which the second portion extends at a first angle with respect to the front side of the housing,
when the cassette is in the retracted state, the cable support device is in the second state, in which the second portion extends at a second angle with respect to the front side of the housing, the second angle being different from the first angle, the second angle based on a position of the front side of the cassette away from the front side of the housing.

2. The apparatus of claim 1, wherein the second portion further includes a portal adapted for receiving the length of the at least one cable longitudinally therethrough.

3. The apparatus of claim 2, wherein, in the installed state, the portal is adapted to be contacted by the bottom surface of the cassette as the cassette is transitioned between the stored state and the retracted state.

4. The apparatus of claim 1, wherein the first portion is hingedly connected to the second portion.

5. The apparatus of claim 1, wherein the first portion is pivotably connected to the second portion.

6. The apparatus of claim 1, wherein the cable support device includes resilient material and is configured such that the support device is normally in the first state absent a force being applied to the cable support device.

7. The apparatus of claim 6, wherein the cable support includes a flange at the back side for coupling the cable support device to the housing.

8. The apparatus of claim 1, wherein, in the first state, the first portion and the second portion are coplanar; and
in the second state, the first portion and the second portion are not coplanar.

9. A communication cable system comprising:
a housing having front, back, left, right, top and bottom sides,
at least one cassette slidably received within the housing and transitionable between a stored state and a retracted state, each cassette including:
an enclosure having a bottom surface extending from a front side to a back side of the cassette, and
one or more ports at the front side of the cassette configured to couple to a cable;
at least one cable support device, each cable support device having a first portion at a back side thereof and a second portion at a front side opposite the back side of the cable support device, wherein the second portion is adapted to support a length of a cable extending along a direction of the front side of the cable support device, wherein the cable support device is transitionable between a first state and a second state,
wherein the cable support device is coupled at the first portion to the front side of the housing such that a bottom surface of a first cassette of the at least one cassette is immediately overlying the cable support device, and wherein, in the first state, the second portion extends at a first angle with respect to the front side of the housing;

wherein, in the second state, the second portion extends at a second angle with respect to the front side of the housing, the second angle being different from the first angle and based on a position of the front side of the cassette away from the front side of the housing;

wherein the cable support device is in the first state when the cassette is in the stored state; and wherein the cable support device is in the second state when the cassette is in the retracted state.

10. The system of claim 9, wherein the at least one cassette includes a first plurality of cassettes arranged within the housing in a first stack extending between the top and bottom side of the housing and a second plurality of cassettes arranged within the housing in a second stack extending between the top and bottom side of the housing adjacent to the first stack, wherein the first cassette is in the first stack and a cable having the length supported by the cable support device beneath the first cassette is coupled to a second cassette of the second stack.

11. The system of claim 9, wherein the cable support device transitions from the second state to the first state when the first cassette is moved toward the back side of the housing, and the cable support device transitions from the first state to the second state when the cassette is moved away from the back side of the housing.

12. The system of claim 9, wherein the second portion further includes a portal adapted for receiving the length of the cable longitudinally therethrough.

13. The system of claim 12, wherein the portal is adapted to be contacted by the bottom surface of the cassette as the cassette is transitioned between the stored state and the retracted state.

14. The system of claim 9, the at least one cassette further comprising a lid.

15. The system of claim 9, wherein the one or more ports are individually pivotable toward the left or right side of the housing.

16. The system of claim 9, wherein the one or more ports are individually pivotable toward the top side or bottom side of the housing.

17. The system of claim 9, wherein the at least one cassette includes one or more connectors connected to the one or more ports, each connector configured to couple to a cable at the front side of the cassette.

18. The system of claim 9, wherein the at least one cassette includes a lip extending along the front side and defining a space along which a length of cable can longitudinally extend in a direction of the front side.

19. The system of claim 9, wherein the housing includes a vertical guide disposed along at least one of the left or right sides.

* * * * *